United States Patent
Gopal et al.

(10) Patent No.: US 12,091,615 B2
(45) Date of Patent: Sep. 17, 2024

(54) FCC CATALYST COMPOSITION AND A PROCESS FOR ITS PREPARATION

(71) Applicant: Reliance Industries Limited, Mumbai (IN)

(72) Inventors: Ravichandran Gopal, Coimbatore (IN); Nirav Jethalal Jani, Bhavnagar (IN); Ankit Vipinkumar Patel, Bhavnagar (IN); Asit Kumar Das, Jamnagar (IN)

(73) Assignee: Reliance Industries Limited, Mumbai (IN)

( * ) Notice: Subject to any disclaimer, the term of this patent is extended or adjusted under 35 U.S.C. 154(b) by 303 days.

(21) Appl. No.: 17/633,099

(22) PCT Filed: Oct. 3, 2020

(86) PCT No.: PCT/IB2020/059304
§ 371 (c)(1),
(2) Date: Feb. 4, 2022

(87) PCT Pub. No.: WO2021/064702
PCT Pub. Date: Apr. 8, 2021

(65) Prior Publication Data
US 2022/0333017 A1    Oct. 20, 2022

(30) Foreign Application Priority Data
Oct. 4, 2019   (IN) .............................. 201921040375

(51) Int. Cl.
| | |
|---|---|
| *C10G 11/05* | (2006.01) |
| *B01J 21/04* | (2006.01) |
| *B01J 21/08* | (2006.01) |
| *B01J 21/16* | (2006.01) |
| *B01J 23/10* | (2006.01) |
| *B01J 29/08* | (2006.01) |
| *B01J 35/23* | (2024.01) |
| *B01J 35/30* | (2024.01) |
| *B01J 35/51* | (2024.01) |
| *B01J 35/61* | (2024.01) |
| *B01J 35/63* | (2024.01) |
| *B01J 37/00* | (2006.01) |
| *C10G 3/00* | (2006.01) |

(52) U.S. Cl.
CPC .............. *C10G 11/05* (2013.01); *B01J 21/04* (2013.01); *B01J 21/08* (2013.01); *B01J 21/16* (2013.01); *B01J 23/10* (2013.01); *B01J 29/088* (2013.01); *B01J 35/23* (2024.01); *B01J 35/30* (2024.01); *B01J 35/51* (2024.01); *B01J 35/615* (2024.01); *B01J 35/633* (2024.01); *B01J 37/0045* (2013.01); *C10G 3/49* (2013.01); *C10G 2300/70* (2013.01); *C10G 2400/20* (2013.01)

(58) Field of Classification Search
CPC ... B01J 21/04; B01J 21/08; B01J 21/16; B01J 23/10; B01J 29/088; B01J 35/23; B01J 35/30; B01J 35/51; B01J 35/615; B01J 35/633; B01J 37/0036; B01J 37/0045; C10G 3/49; C10G 3/57; C10G 11/05; C10G 11/18; C10G 2300/70; C10G 2400/20
See application file for complete search history.

(56) References Cited

U.S. PATENT DOCUMENTS

| | | | |
|---|---|---|---|
| 9,067,196 B2 | 6/2015 | Ravichandran et al. | |
| 10,130,943 B2 * | 11/2018 | Karthikeyani | ......... B01J 29/405 |
| 2013/0203586 A1 | 8/2013 | Stamires et al. | |
| 2018/0126365 A1 | 5/2018 | McGuire, Jr. et al. | |

OTHER PUBLICATIONS

International Search Report issued in International Application No. PCT/IB2020/059304 dated Jan. 13, 2021 (3 pages).
Written Opinion issued in International Application No. PCT/IB2020/059304 dated Jan. 13, 2021 (7 pages).

* cited by examiner

*Primary Examiner* — Brian A Mccaig
(74) *Attorney, Agent, or Firm* — Osha Bergman Watanabe & Burton LLP

(57) ABSTRACT

The present disclosure relates to an FCC catalyst composition and a process for preparing the same. In a first aspect, there is provided an FCC catalyst composition comprising 25 to 45 wt % Y-type zeolite, 20 to 40 wt % silicon oxide, 5 to 25 wt % alumina, 5 to 35 wt % of at least one clay and 0.5 to 3 wt % of at least one rare earth oxide. The weight % of each of the component is with respect to the total weight of the composition. The FCC catalyst composition has an average particle size in the range of 45-120μ. In a second aspect, there is provided a process for preparing the FCC catalyst composition, which uses ball milled pseudoboehmite having an average particle size in the range of 1 to 8 micron and the whole process is carried out at a pH value in the range of 6 to 7.

15 Claims, No Drawings

FCC CATALYST COMPOSITION AND A PROCESS FOR ITS PREPARATION

FIELD

The present disclosure relates to an FCC catalyst composition and a process for preparing the same.

Definitions

As used in the present disclosure, the following terms are generally intended to have the meaning as set forth below, except to the extent that the context in which they are used indicates otherwise.

Fluid Catalytic Cracking (FCC): The term "fluid catalytic cracking" refers to the process used in petroleum refineries to convert the high-boiling, high-molecular weight hydrocarbon fractions of petroleum crude oils to more valuable gasoline, olefinic gases and other products.

FCC catalyst: The term "FCC catalyst" refers to catalytic material used in a fluidized bed catalytic process to convert a petroleum fraction into a primarily gasoline fraction.

Attrition loss rate: The term "Attrition loss rate" is defined as catalyst loss due to physical abrasion, attrition, or grinding of catalyst particles during its use in catalytic conversion processes. The lower the attrition rate the more attrition resistant are the catalyst particles.

Slurry or suspension: The term "Slurry or suspension" is referred to a mixture of catalyst components and a dispersant/dispersing agent, for example, water.

Clarified Slurry Oil (CSO): The term "Clarified Slurry Oil" refers to the heavy aromatic oil produced as a byproduct in an FCC unit, which ends up in the bottoms of the fractionator.

Light Cycle Oil (LCO): The term "light cycle oil" refers to an unwanted liquid residue produced during catalytic cracking of heavy hydrocarbon fractions from earlier stages of refining.

Dry gas: The term "Dry gas" refers to C2 and lighter gases that are produced in the FCC unit.

Y-type Zeolite: The term "Y-type zeolite" refers to the family of aluminosilicate molecular sieves with a faujasite-type structure (FAU), which is characterized by higher silica to alumina (Si/Al) ratio.

Ultrastable Y Zeolite: The term "Ultrastable Y Zeolite" refers to a form of a Y-type zeolite in which the majority of sodium ions are removed and treated thermally to enhance its thermal and steam stability. USY has proved exceedingly useful in FCC catalysts.

BACKGROUND

The background information herein below relates to the present disclosure but is not necessarily prior art.

The global demand for gasoline, LPG and light olefins ($C_3$ and $C_4$) is continuously growing. Gasoline is used for various energy requirements. Propylene is used for the manufacturing polypropylene, while $C_4$ olefins are used in alkylation units to produce high value alkylates.

In refineries, by-products such as coke, and dry gas are undesired products of crude oil. Therefore, the conversion of crude oil to high value products such as gasoline and light olefins ($C_3$ and $C_4$) has always been targeted by refineries.

The total gasoline production from refineries by various distillation processes is ~50% gasoline/barrel of crude oil. In refining and petrochemical industry, the fluid catalytic cracking is a chemical process that uses a catalyst to create new, smaller molecules from larger molecules. "Fluid catalytic cracking" (FCC) is used to convert the high-boiling, high-molecular weight hydrocarbon fractions of petroleum crude oils to more valuable gasoline, olefinic gases and other products. Further, FCC is also the cheapest way to obtain gasoline and light olefins ($C_3$ and $C_4$).

FCC process employs a highly active micro-spherical catalyst comprising optimum amount of Y-type zeolite with active binder system to achieve a higher conversion of the high-molecular weight hydrocarbon fraction into gasoline. The catalytic activity of the FCC catalyst is predominantly a function of the number of acid sites present in the catalyst. However, high activity generally results in coke, clarified slurry oil (CSO) and dry gas, which are mostly undesired by products of crude oil. To overcome the above drawbacks, conventionally the FCC catalyst is modified by controlling acid functionality of the matrix and use of optimum amount of the zeolite in the formulation.

Although, the yield of light olefins increases with increase in conversion and increase in the temperature, its formation is also controlled by equilibrium mechanism. The change in the thermodynamic equilibrium by increasing the temperature leads to the formation of more dry gas due to over-cracking of light olefins. Hence one of the challenge is to improve the light olefin yield, while minimizing the dry gas formation at higher conversion (>76 weight %) to increase refinery profit.

Therefore, development of a new composition for an FCC catalyst for converting low value products from a hydrocarbon feed into high value products in the area of refining and petrochemicals is of commercial interest.

Therefore, there is felt a need to provide an FCC catalyst composition that mitigates the drawbacks mentioned herein above.

OBJECTS

Some of the objects of the present disclosure, which at least one embodiment herein satisfies, are as follows:

An object of the present disclosure is to ameliorate one or more problems of the prior art or to at least provide a useful alternative.

Another object of the present disclosure is to provide an FCC catalyst composition.

Still another object of the present disclosure is to provide a process for preparing the FCC catalyst composition.

Yet another object of the present disclosure is to provide an FCC catalyst composition that provides higher yields of propylene and LPG.

Yet another object of the present disclosure is to provide an FCC catalyst composition for providing increased light olefin yield.

Yet another object of the present disclosure is to provide an FCC catalyst composition for converting low value hydrocarbons (CSO and LCO) to high value gasoline range molecules.

Other objects and advantages of the present disclosure will be more apparent from the following description, which is not intended to limit the scope of the present disclosure.

SUMMARY

The present disclosure relates to an FCC catalyst composition and a process for its preparation. In a first aspect, an FCC catalyst composition comprises 25 to 45 wt % Y-type zeolite, 20 to 40 wt % silicon oxide, 5 to 25 wt % alumina, 5 to 35 wt % of at least one clay, and 0.5 to 3 wt % of at least one rare earth oxide. The weight % of each of the component is with respect to of the total weight of the FCC catalyst composition. The Y-type zeolite has silica to alumina ratio (SAR) in the range of 8:1 to 15:1. The FCC catalyst composition has an average particle size in the range of 45-120μ.

In a second aspect, a process for preparing the FCC catalyst composition, comprises ball milling precursor of alumina in an aqueous medium for 5 to 120 mins to reduce its average particle size in the range of 1 to 8μ. The ball milled precursor of alumina is mixed with slurry comprising clay and a dispersant, followed by stirring to obtain a first slurry comprising precursor of alumina and clay. A precursor of silicon oxide is added to the first slurry and stirred to obtain a second slurry comprising precursor of silica, precursor of alumina and clay. A Y-type zeolite having a silica to alumina ratio in the range of 8:1 to 15:1, is mixed with the second slurry to obtain a third slurry having a pH value in the range of 6 to 7 and ball milling the third slurry to obtain a homogenized slurry. The homogenized slurry is spray dried, followed by calcining to obtain microspheres. The microspheres are mixed with at least one rare earth compound having a pH value in the range of 2 to 4, to form a suspension. The suspension is heated at a temperature in the range of 60 to 90° C., filtered, washed, dried and calcined to obtain the FCC catalyst composition.

The process step of mixing ball milled precursor of alumina with slurry comprising clay, and the order of process step addition of a precursor of silicon oxide to the first slurry, is interchangeable.

The dispersant is either added with clay, or with zeolite.

In accordance with the present disclosure, the precursor of alumina is in an amount in the range of 5 to 25 weight % of the total weight of the FCC catalyst composition.

In accordance with the present disclosure, the precursor of alumina is pseudo boehmite.

In accordance with the present disclosure, the clay is at least one selected from the group consisting of kaolin, montmorillonite, sapiolite, halloysite and bentonite, and is in an amount in the range of 5 to 35 wt % of the total weight of the FCC catalyst composition.

In accordance with the present disclosure, the dispersant is selected from the group consisting of sodium hexa meta phosphate, sodium pyrophosphate, poly acrylic acid, derivatives of poly acrylic acid and mixture thereof.

In accordance with the present disclosure, the precursor of silicon oxide is selected from the group consisting of sodium free colloidal silica, fumed silica, silicic acid and mixture thereof, and is in an amount in the range of 20 to 40 wt % of the total weight of the FCC catalyst composition.

In accordance with the present disclosure, the rare earth compound is at least one selected from the group consisting of lanthanum nitrate, cerium nitrate, praseodymium nitrate and neodymium nitrate, and is in an amount in the range of 0.5 to 3 wt % of the total weight of the FCC catalyst composition.

In accordance with the present disclosure, the calcined FCC catalyst composition is treated with at least one rare earth compound for a period of time in the range of 0.5 to 2 hours, filtered, dried at a temperature in the range of 80 to 120° C. and calcined at a temperature in the range of 450 to 650° C., for a time period in the range of 0.5 and 6 hours to obtain the FCC catalyst composition.

In a third aspect, the process for catalytic cracking a hydrocarbon feed comprises contacting the hydrocarbon feed with the FCC catalyst composition, at a catalyst to oil ratio of 4:1 to 12:1 at a temperature in the range of 530 to 575° C., to obtain high value gasoline range molecules in high yields and low value hydrocarbons (CSO and LCO) in low yields.

In accordance with the present disclosure, the feed includes olefin streams selected from the group consisting of naphtha, gasoline, light cycle oil, vacuum gas oil, coker oil, resid hydrocarbons, other heavier hydrocarbon (>C5+), crude and combination thereof.

DETAILED DESCRIPTION

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

In an FCC process a highly active micro-spherical catalyst is employed to convert a high-molecular weight hydrocarbon into valuable products namely gasoline and lower olefin fractions. However, high activity results in low value products such as coke, dry gas and sometimes lower clarified slurry oil (CSO), which are mostly undesired by products of crude oil. To overcome these drawbacks, conventionally the FCC catalyst is modified by controlling acid functionality of the catalyst matrix and use of high amount of zeolite in the catalyst composition.

The present disclosure envisages an FCC catalyst composition to convert a high-molecular weight hydrocarbon fraction into gasoline and improved light olefin yield, and for minimizing undesired low value products such as coke, clarified slurry oil (CSO) and dry gas.

In a first aspect of the present disclosure, there is provided an FCC catalyst composition. The FCC Catalyst composition comprises a Y-type zeolite in an amount in the range of 25 to 45 wt % of the total weight of the composition, silicon oxide in an amount in the range of 20 to 40 wt % of the total weight of the composition, alumina in an amount in the range of 5 to 25 wt % of the total weight of the composition, at least one clay in an amount in the range of 5 to 35 wt % of the total weight of the composition and at least one rare earth oxide in an amount in the range of 0.5 to 3 wt % of the total weight of the composition. The FCC catalyst composition has an average particle size in the range of 45-120μ.

In accordance with one embodiment of the present disclosure, the FCC catalyst composition has an average particle size in the range of 70-100μ, and an attrition index of less than 10.

Zeolite component in the FCC catalyst composition provides catalytic activity to the catalyst.

In the present disclosure, the activity of the FCC catalyst is enhanced by incorporating the Y-type zeolite in an amount in the range of 25 to 45 wt % of the total weight of the composition, which also provides greater stability to the FCC catalyst in the plant.

In accordance with the preferred embodiments of the present disclosure, the Y-type zeolite has silica to alumina ratio (SAR) in the range of 8:1 to 15:1.

In the present disclosure, the Y-type zeolite having a silica to alumina ratio (SAR) in the range of 8:1 to 15:1, prevents hydrogen transfer reactions. Thereby leading to higher yields of light olefins.

As the silica to alumina ratio (SAR) increases beyond 15:1, the number of active sites on the zeolite decreases. As a result greater amount of Zeolite is required for preparing the catalyst composition, which results in reduced binding, increased viscosity and difficulty in processing the composition.

In the present disclosure, the Y-type zeolite has unit cell size (UCS) in the range of 24.25 to 24.65 Å.

In the present disclosure, the Y-type zeolite has surface area in the range of 600 to 950 m$^2$/g.

In one embodiment of the present disclosure, the Y-type zeolite has soda content in the range of 0.001 to 0.5 weight %.

In the present disclosure, the Y-type zeolite is ultrastable Y (USY) zeolite.

Alumina and/or silica are used in the FCC catalyst composition as binders, to provide mechanical strength by linking the zeolite crystallites, thereby resulting in an improvement in ability of the catalyst to resist physical breakdown. The binder's function and effect is realized only after it has gone through a physical and chemical transformation, which varies depending on the type of binder used.

In accordance with the present disclosure, silicon oxide is in the range of 20 to 40 weight % of the total weight of the composition.

The alumina used is a highly porous aluminium oxide ($Al_2O_3$) having very high surface-area to weight ratio. Alumina is in the range of 10 to 25 weight % of the total weight of the composition.

In accordance with the embodiments of the present disclosure, the clay is at least one selected from the group consisting of kaolin, halloysite, bentonite, and combinations thereof.

In accordance with one embodiment of the present disclosure, the clay is kaolin.

Rare earth (RE) oxides are used in the FCC catalyst composition to enhance its hydrothermal stability, and improve its conversion activity as a result of an increase in the strength of acid sites. However, RE also promotes hydrogen transfer activity and reduces the propylene yield. Therefore, desirable amount of RE is exchanged on Y-type zeolites to optimize the activity by minimizing hydrogen transfer.

In accordance with the preferred embodiments of the present disclosure, the FCC catalyst contains at least one rare-earth oxide in an amount in the range of 0.5 to 3 wt % of the FCC catalyst.

In accordance with the embodiments of the present disclosure, the rare earth metal oxide is at least one selected from the group consisting of lanthanum oxide, cerium oxide, praseodymium oxide, and neodynium oxide.

In accordance with one embodiment of the present disclosure, the rare earth metal oxide is lanthanum oxide.

In a second aspect of the present disclosure, there is provided a process for preparing the FCC catalyst composition. The process comprises the following steps:
  a) Wet ball milling a precursor of alumina in an aqueous medium to reduce its average particle size in the range of 1 to 8μ;
  b) Mixing the ball milled precursor of alumina with aqueous slurry comprising clay and a dispersant, followed by stirring to obtain a first slurry comprising precursor of alumina and clay;
  c) Adding a precursor of silica to the first slurry and stirring to obtain a second slurry comprising precursor of silica, precursor of alumina and clay;
  d) Mixing a Y-type zeolite having a silica to alumina ratio in the range of 8:1 to 15:1, with the second slurry to obtain a third slurry having a pH value in the range of 6 to 7 and ball milling the third slurry to obtain a homogenized slurry.
  e) Spray drying the homogenized slurry, followed by calcining to obtain microspheres;
  f) Mixing the microspheres with at least one rare earth compound having a pH value in the range of 2 to 4, to form a suspension; and
  g) Heating the suspension at a temperature in the range of 60 to 90° C., followed by filtering, washing, drying and calcining to obtain the FCC catalyst composition.

The order of process step of mixing ball milled precursor of alumina with slurry comprising clay, and the process step addition of a precursor of silicon oxide to the first slurry, is interchangeable.

In an exemplary embodiment, the ball milled precursor of alumina is mixed with slurry comprising clay to obtain a first slurry comprising the precursor of alumina and the clay, followed by addition of a precursor of silicon oxide to the first slurry to obtain a second slurry comprising precursor of silica, precursor of alumina and clay.

In another exemplary embodiment, the ball milled precursor of alumina is mixed with a precursor of silicon oxide to obtain a first slurry comprising the precursor of alumina and the precursor of silicon oxide, followed by addition of slurry comprising clay to the first slurry to obtain a second slurry comprising precursor of silica, precursor of alumina and clay.

In an exemplary embodiment, the dispersant is added with clay.

In another exemplary embodiment, the dispersant is added with zeolite.

The precursor of alumina is in an amount in the range of 5 to 25 weight % of the total weight of the homogenized slurry.

In accordance with the present disclosure, the precursor of alumina is wet ball milled in an aqueous medium for a 0.1 to 2 hours to reduce its average particle size in the range of 1 to 8μ.

The precursor of alumina is selected from pseudoboehmite, aluminium trihydrate, gamma alumina, theta alumina and colloidal alumina.

In accordance with one embodiment of the present disclosure, the alumina is pseudoboehmite.

Pseudobohemite is "poorly crystallized" $Al^{3+}$ compound of composition $Al_2O_3 \cdot xH_2O$ (2.0>x>1.0) with interplanar spacings increased in the [020] direction to 0.67 nm (6.7 Å) in comparison with 6.12 Å for boehmite of composition $Al_2O_3 \cdot 1H_2O$.

Peptization or Deflocculation is the process for formation of stable dispersion of colloidal particles in dispersion medium. In the process of peptization, a precipitate is converted into a colloidal sol by shaking it with a dispersion medium in the presence of small amount of electrolyte, which is called as peptizing agent.

Pseudoboehmite is subjected to wet ball milling thereby reducing the average particle size in the range of 1 to 8 microns. At this particle size, pseudo boehmite is readily dispersed and does not require addition of peptizing agent Small particle size of pseudoboehmite leads to increased surface area that results in greater binding.

In accordance with the present disclosure, the precursor of alumina is not subjected to acid treatment.

Clay is used in the FCC catalyst composition as a filler material, to achieve desirable dispersion, porosity for better diffusion characteristics, and to increase particle density of the FCC catalyst particles.

The clay content of the catalyst composition is in the range of 5 to 35 wt % of the total weight of homogenized slurry.

The clay is at least one selected from the group consisting of kaolin, montmorillonite, sapiolite, halloysite and bentonite.

The dispersant promotes uniform suspension of the solid clay particles in a liquid phase.

In accordance with the present disclosure, the dispersant is selected from the group consisting of sodium hexa meta phosphate, sodium pyrophosphate, poly acrylic acid, derivatives of poly acrylic acid, and mixtures thereof.

In one embodiment of the present disclosure, the dispersant is sodium hexa meta phosphate.

Generally, colloidal silica is associated with Sodium (Na) ions.

In accordance with the present disclosure, the precursor of silicon oxide is selected from the group consisting of sodium free colloidal silica, fumed silica, silicic acid, and mixture thereof.

In one embodiment of the present disclosure, the precursor of silicon oxide is sodium free colloidal silica.

In accordance with the present disclosure, the precursor of silicon oxide is ammonia stabilized.

In the present disclosure, the Y-type zeolite is in an amount in the range of 25 to 45 wt % of the total weight of the homogenized slurry.

In the present disclosure, the Y-type zeolite is ultrastable Y (USY) zeolite.

In the process of the present disclosure, Y-type zeolite is added at the end, in order to avoid the difficulties in processing. Zeolite being porous material adsorbs water, leading to increase in viscosity and thus the increased difficulty in processing.

In the process of the present disclosure, the specific order of mixing the components leads to easy processability of the catalyst composition, change of order of addition of any component leads to higher viscosity.

Mixing refers to homogenization of the catalyst components in the slurry. In addition to homogenization, particle size reduction is also accomplished. Mixing can be achieved in either a batch mode or continuous circulation mode or combination of both.

In accordance with the present disclosure, the step of mixing is carried out in an equipment or device known in the art.

In accordance with the present disclosure, in the step of mixing a Y-type zeolite, the slurry has a pH value in the range of 6 to 7.

In the process of the present disclosure, in the step of mixing a Y-type zeolite, the pH of the slurry is in the range of 6 to 7 as a result of the components of the composition, without adding any acid or base to the slurry.

In one embodiment of the present disclosure, in the step of mixing a Y-type zeolite, the slurry has a pH value of 6.5.

In the process of the present disclosure, pH in the range of 6 to 7 results in optimized viscosity, which is less than 1000 cP, which leads to ease of processability of the composition. Any increase or decrease in the pH leads to increase in viscosity of the composition, leading to difficulty in processability of the composition. Further, pH above 7 increases attrition rate of the catalyst particles.

In accordance with the present disclosure, in the step of mixing a Y-type zeolite, the slurry comprises solids in the range of 20 to 50 wt %.

"Spray drying" involves atomization of the catalyst composition in the form of slurry, followed by drying the atomized catalyst composition in an apparatus called spray dryer.

In accordance with the present disclosure, in the step of spray drying, the micro-spheroidal particles have mesopores in the range of 60 to 200 nm.

The step of calcining is carried out at a temperature in the range of 450 to 650° C., for time period in the range of 0.5 and 6 hours.

In accordance with the present disclosure, the FCC catalyst has surface area in the range of 350 $m^2/g$ to 480 $m^2/g$.

The FCC catalyst has pore volume in the range of 0.35 g/cc to 0.5 g/cc.

In accordance with the present disclosure, the rare earth compound is at least one selected from the group consisting of lanthanum nitrate, cerium nitrate, praseodymium nitrate, and neodymium nitrate.

In one embodiment of the present disclosure, the rare earth compound is lanthanum nitrate.

In accordance with the present disclosure, the FCC catalyst composition is treated with at least one rare earth compound dissolved in water for a period of time in the range of 0.5 to 2 hours, and its pH is adjusted to a value in the range of 2 to 4, to obtain a suspension. The suspension heated at a temperature in the range of 60 to 90° C., followed by cooling, and then the cooled suspension is filtered using a known filtration technique, washed, and dried at a temperature in the range of 80 to 120° C., and calcined at a temperature in the range of 450 to 650° C., for time period in the range of 0.5 and 6 hours to obtain a rare earth exchanged FCC catalyst composition.

In one embodiment, the pH of the suspension is adjusted to a value of 3, to obtain a suspension.

In accordance with the present disclosure, the rare earth exchanged FCC catalyst composition comprises rare earth in its oxide form.

In a third aspect of the present disclosure, there is provided a process for catalytic cracking a hydrocarbon feed, by contacting the hydrocarbon feed with the FCC catalyst composition of the present disclosure, at a catalyst to oil (C/O) ratio of 4:1 to 12:1, at a temperature in the range of 530 to 575° C., to obtain high value gasoline range molecules in high yields and low value hydrocarbons (CSO and LCO) in low yields. The high value gasoline range molecules include propylene and LPG with enhanced yields.

In the FCC process, the catalyst circulates between the riser and the regenerator. The catalytic reaction in the riser occurs in less than 10 seconds, during which the catalyst resides in the riser. Hence, catalyst to oil (C/O) ratio is 4:1 to 12:1. Therefore, the catalyst is in larger amount as compared to the oil feed, and this is known in the art.

The FCC catalyst composition is hydrothermally deactivated at a temperature in the range of 750° C. to 850° C., in a fluid bed laboratory reactor for a time period in the range of 3 hours to 200 hours under 60% to 100% steam.

The feed includes olefin streams selected from the group consisting of $C_5$-$C_{12}$ naphtha, $C_4$-$C_6$ paraffin, gas oil, light cycle oil, vacuum gas oil, coker oil, resid hydrocarbons, other heavier hydrocarbon (>C5+), crude, oil residue, slurry oil, heavy crude, biomass, waste plastic, methanol, dimethyl ether and combination thereof.

The cracking process using the catalyst composition of the present disclosure, provides lower LCO and reduces CSO yields.

The quantity of Y zeolite in an FCC catalyst composition, determines the catalytic activity and selectivity for gasoline, propylene, LCO and coke. In addition, the quantity of Y zeolite in an FCC catalyst composition, determines the key physico-chemical properties such as attrition resistance, of the FCC catalyst. The conversion of the hydrocarbon feed generally increases with an increase in zeolite content in the catalyst composition. To a person skilled in the art, it is known that yield of coke increases substantially with an increase in the conversion beyond 60 weight %. Although, formation of coke is necessary to maintain heat balance in an FCC operation, excess amount of coke deactivates the catalyst and decreases catalyst circulation rate, leading to reduced conversion of the hydrocarbon feed.

In the present disclosure, by employing the FCC catalyst composition comprising Y-type zeolite having a silica to alumina ratio of 12:1, for example, it is observed that the conversion of high-molecular weight hydrocarbon into valuable products is increased by an amount of 3.9%, the amount of the LCO is reduced by an amount of 7.3%, the amount of the CSO is reduced by an amount of 28%, the amount of the propylene is increased by an amount of 6.9%, the amount of the gasoline is increased by an amount of 2.9%, the amount of the LPG is increased by an amount of 5.1%, as compared to the conventional FCC catalyst composition comprising Y-type zeolite having a silica to alumina ratio of 5:1.

In the present disclosure, increase in the amount of propylene can be attributed to the reduction in the hydrogen transfer reaction. The hydrogen transfer reaction leads to reduction of propylene to propane.

The catalyst composition of the present disclosure has enhanced efficacy, longer catalytic life, and it can be regenerated with ease and reused.

The catalyst composition of the present disclosure is effectively used for reducing coke, CSO and dry gas in the FCC process while improving the yields of gasoline and light olefin. The better performance of the catalyst composition is due to the method of preparing the FCC catalyst, using ball milled pseudo boehmite having a particle size in the range of 1 to 8μ, and using a zeolite having a silica to alumina ratio in the range of 8:1 to 15:1.

It is well known that formation of high coke make during the FCC process is known to lower the life of the FCC catalyst, therefore the FCC catalyst of the present disclosure which reduces the amount of coke make, increases the life of the FCC catalyst.

An FCC catalyst having poor attrition resistance produces more fines, leading to reduced catalytic activity, and creates environmental as well as operational problems. Attrition resistance of the FCC catalyst is one of the key parameters to minimize loss of zeolite present in the FCC catalyst in an FCC operation. It is a challenge to achieve a desired level of attrition resistance for an FCC catalyst while accomplishing a desired level of catalytic activity.

The FCC catalyst of the present disclosure has a desired particle size with appropriate bulk density and attrition resistance to maintain the fluidization of all inventory without any fines generation. Hence, by using the FCC catalyst of the present disclosure, the FCC process can be smoothly carried out without necessitating any shutdown.

Therefore, the catalyst composition of the present disclosure provides benefits of long service life, thereby avoiding the frequent catalyst replacement and generation of huge solid waste. Further, the spent catalyst composition is easily regenerated and efficiently used for removing olefinic impurities from a hydrocarbon.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following laboratory scale experiments which are set forth for illustration purpose only and not to be construed for limiting the scope of the disclosure. These laboratory scale experiments can be scaled up to industrial/commercial scale and the results obtained can be extrapolated to industrial/commercial scale.

Experimental Details

COMPARATIVE EXAMPLE 1: Preparation of FCC Catalyst in Accordance with the Conventional Method Wet Ball milled Pseudo boehmite (836 g) having an average particle size in the range of 1 to was mixed with Clay (753 g) to obtain a first slurry comprising clay and pseudo boehmite. Sodium free colloidal silica (4667 g) was added to the first slurry under stirring to obtain a second slurry comprising Sodium free colloidal silica, clay and pseudo boehmite. Sodium free USY zeolite (1890 g) having a silica to alumina ratio of 5.1, was mixed with the second slurry to form a third slurry having a pH of 4 and the third slurry was ball milled to obtain a homogenized slurry of the FCC catalyst composition having average particle size of 10μ. The slurry was spray dried and then calcined at 600° C. for 3 hours to obtain a calcined FCC catalyst composition.

The calcined FCC catalyst composition was later treated with rare earth salt solution (2.5 g in 1 L) at 80° C. to exchange H of USY (100 g) to obtain the rare earth (RE) exchanged FCC catalyst composition. The RE exchanged FCC catalyst composition was calcined at 550° C. for 1 hour in a muffle furnace to obtain the FCC catalyst composition termed as catalyst of the comparative Example-1.

Physico chemical properties of catalyst of the comparative Example-1 were analyzed, which are presented in Table 1.

EXAMPLE 1: Preparation of FCC Catalyst in Accordance with the Present Disclosure Wet ball milled pseudo boehmite (836 g) having an average particle size in the range of 1 to 8 was mixed with Kaolin (753 g) and sodium hexa meta phosphate (20 g) to obtain a first slurry comprising Kaolin and pseudo boehmite. Sodium free colloidal silica (4667 g) was added to the first slurry under stirring to obtain a second slurry comprising Sodium free colloidal silica, clay and pseudo boehmite. Sodium free USY zeolite (1710 g) having a silica to alumina ratio of 12:1, was mixed with the second slurry to obtain a third slurry having a pH of 6.5 and the third slurry was ball milled to obtain a homogenized slurry having average particle size in the range of 10μ. The slurry was spray dried and then calcined at 600° C. for 3 hours to obtain a calcined FCC catalyst composition. The calcined FCC catalyst composition was later treated with lanthanum nitrate salt solution (25 g in 1 L, 2.5 wt %) at about 80° C. to exchange H of USY (100 g) to obtain a rare earth (RE) exchanged FCC catalyst composition. The RE exchanged FCC catalyst composition was calcined at 550° C. for 1 hour in a muffle furnace to obtain the FCC catalyst composition termed as catalyst-1.

Physico chemical properties of catalyst-1 were analyzed. The properties of the catalyst-1, and results of the FCC process in which the catalyst-1 was used for achieving 78% conversion of hydrocarbon are presented in Table 1.

TABLE 1

Physicochemical characteristics of the calcined FCC catalysts

| Sample description | Catalyst of Example-1 | Catalyst of Comparative Example-1 |
| --- | --- | --- |
| Total Surface Area (m²/g) | 351 | 363 |
| Zeolite Surface Area (m²/g) | 173 | 186 |
| Total Pore Volume (cc/g) | 0.39 | 0.39 |
| Steam deactivated micro-spheroidal catalyst | | |
| Total Surface Area (S) (m²/g) | 199 | 214 |
| Zeolite Surface Area (S) m²/g | 111 | 88 |
| Total Pore Volume (S), cc/g | 0.32 | 0.29 |
| Attrition Index, % | 6 | 10 |

The catalyst composition of the present disclosure and catalyst of the comparative Example-1 (conventional FCC catalyst) were used in an FCC process to convert high-molecular weight hydrocarbons into valuable products namely LPG, gasoline and lower olefin fractions. The results are provided in Table-2 below.

TABLE 2

Catalytic performance of FCC catalyst of the present disclosure (prepared in Example 1) compared with conventional FCC catalyst.

| Sample description | Catalyst of Example-1 USY Zeolite (SAR = 12) | Catalyst of Comparative Example-1 USY Zeolite (SAR = 5) |
| --- | --- | --- |
| Hydrocarbon Conversion % | 79 | 76 |
| Dry Gas | 3.1 | 2.6 |
| LPG | 36.8 | 35.0 |
| Propylene | 15.3 | 14.3 |
| Gasoline | 34.8 | 33.8 |
| LCO | 15.3 | 16.5 |
| CSO | 5.4 | 7.5 |
| Coke | 4.6 | 4.5 |
| Cat/Oil Ratio | 8 | 8 |

It is clearly seen from Table-2, that the FCC catalyst prepared in Example-1 of the present disclosure, which uses a zeolite having a silica to alumina ratio of 12:1, leads to improved yield of LPG, gasoline and propylene while minimizing the amount of LCO and CSO, in comparison with conventional FCC catalyst prepared in comparative Example-1 that uses a zeolite having a silica to alumina ratio of 5:1, which provide lower yield of gasoline while providing increased amounts of coke and dry gas.

EXAMPLE 2: Preparation of FCC Catalyst in Accordance with the Present Disclosure Ball milled pseudo boehmite (150 g) having an average particle size in the range of 1 to 8 was mixed with Kaolin (349 g) and sodium hexa meta phosphate (8.0 g) to obtain a first slurry comprising clay and pseudo boehmite. Sodium free colloidal silica (833 g) was added to the first slurry under stirring to obtain a second slurry comprising Sodium free colloidal silica, clay and pseudo boehmite. Sodium free USY zeolite (376 g) having a silica to alumina ratio of 12:1 was mixed with the second slurry to obtain a third slurry having a pH of 6.5 and the third slurry was ball milled to obtain a homogenized slurry having average particle size less than 10μ. The slurry was spray dried and then calcined at 600° C. for 3 hours to obtain calcined FCC catalyst composition.

The calcined FCC catalyst composition was later treated with lanthanum nitrate salt solution (25 g in 1 L, 2.5 wt %) to exchange H of USY (100 g) to obtain the rare earth (RE) exchanged FCC catalyst composition. The RE exchanged FCC catalyst composition was calcined at 550° C. for 1 hour in a muffle furnace to obtain the FCC catalyst composition termed as catalyst-2.

Physico chemical properties of catalyst-2 were analyzed, which are presented in Table 3.

EXAMPLE 3: Preparation of FCC Catalyst in Accordance with the Present Disclosure A similar procedure as given in Example-2 was followed to prepare catalyst-3, except that the active alumina used had larger crystal size.

Physico chemical properties of catalyst-3 were analyzed, which are presented in Table 3.

COMPARATIVE EXAMPLE 2: Preparation of FCC Catalyst in Accordance with the Conventional Method A similar procedure as given in Example-2 was followed to prepare catalyst of the comparative Example-2, except that the zeolite used had silica to alumina ratio of 5:1.

Physico chemical properties of catalyst of the comparative Example-2 were analyzed, which are presented in Table 3.

TABLE 3

Properties of the catalyst of the comparative Example-2, catalyst-2 and catalyst-3 and the results obtained for FCC process
Physicochemical properties

| Properties/Results | catalyst of the comparative Example-2 | Catalyst-2 | Catalyst-3 |
|---|---|---|---|
| TSA (S), m²/g | 167 | 187 | 177 |
| ZSA (S), m²/g | 79 | 108 | 110 |
| MSA (S), m²/g | 88 | 79 | 67 |
| TPV, cc/g | 0.20 | 0.27 | 0.27 |
| ZPV, cc/g | 0.04 | 0.05 | 0.05 |
| MPV, cc/g | 0.16 | 0.22 | 0.22 |
| Acidity (μ/mol/g) | 131 | 74 | 88 |
| Activity (at 78% Conversion) | | | |
| C/O ratio | 7.5 | 7.5 | 7.9 |
| Dry gas | 2.4 | 3.0 | 2.9 |
| LPG | 36.2 | 37.0 | 37.3 |
| Propylene | 14.8 | 15.5 | 15.6 |
| LCO | 16.3 | 15.9 | 16.0 |
| CSO | 5.7 | 6.1 | 6.0 |
| Coke | 5.2 | 4.5 | 3.8 |

After comparing the properties, and the results obtained using the catalyst of the comparative Example-2, catalyst-2 and catalyst-3, it was observed that the results of the FCC process for catalyst-2 and catalyst-3 were better as compared to the catalyst of the comparative Example-2. The yields of the undesired products like coke, LCO, and dry gas were lower for both catalyst-2 and catalyst-3, as compared to the catalyst of the comparative Example-2. Whereas, the yields of the desired products such as LPG, propylene increased. This clearly reveals that the cracking of hydrocarbon feed by using the catalyst composition of the present disclosure resulted in production of lighter and lower olefins.

EXAMPLE 4: Preparation of FCC Catalyst in Accordance with the Present Disclosure A similar procedure as given in Example-2 was followed to prepare catalyst-4, except for using higher matrix silica/alumina ratio, and that the active alumina used had larger crystal size.

Physico chemical properties of catalyst-4 were analyzed, which are presented in Table 4.

EXAMPLE 5: Preparation of FCC Catalyst in Accordance with the Present Disclosure A similar procedure as given in Example-2 was followed to prepare catalyst-5, except that the active alumina used had smaller crystal size as Example-1 and higher alumina content.

Physico chemical properties of catalyst-5 were analyzed, which are presented in Table 4.

COMPARATIVE EXAMPLE 3: Preparation of FCC Catalyst in Accordance with the Conventional Method A similar procedure as given in Example-2 was followed to prepare catalyst of the comparative Example-3, except that the zeolite used had silica to alumina ratio of 5:1.

Physico chemical properties of catalyst of the comparative Example-3 were analyzed, which are presented in Table 4.

TABLE 4

Properties of the catalyst of the comparative Example-3, catalyst-4 and catalyst-5 and the results obtained for FCC process
Physicochemical properties

| Properties/Results | catalyst of the comparative Example-3 | catalyst-4 | catalyst-5 |
|---|---|---|---|
| TSA (S), m²/g | 160 | 201 | 199 |
| ZSA (S), m²/g | 71 | 112 | 111 |
| MSA (S), m²/g | 89 | 89 | 88 |
| TPV, cc/g | 0.20 | 0.34 | 0.32 |
| ZPV, cc/g | 0.03 | 0.05 | 0.05 |
| MPV, cc/g | 0.17 | 0.29 | 0.27 |
| Acidity (μ/mol/g) | 121 | 91 | 91 |
| Activity (at 78% Conversion) | | | |
| C/O ratio | 8.0 | 6.9 | 7.3 |
| Dry gas | 3.3 | 2.6 | 3.0 |
| LPG | 36.0 | 36.2 | 36.6 |
| Propylene | 14.7 | 14.9 | 15 |
| LCO | 16.5 | 15.4 | 16.2 |
| CSO | 5.5 | 6.6 | 5.8 |
| Coke | 5.3 | 4.0 | 4.4 |

After comparing the properties and the results obtained by using the catalyst of the comparative Example-3, catalyst-4 and catalyst-5, it was observed that the results of the FCC process for catalyst-4 and catalyst-5 were better as compared to the catalyst of the comparative Example-3. The yields of the undesired products like coke, LCO, and dry gas were lower for catalyst-4 and catalyst-5, as compared to the catalyst of the comparative Example-3. Whereas, the yields of the desired products such as LPG, and propylene increased. This reveals that the cracking of hydrocarbon feed by using the catalyst composition of the present disclosure resulted in production of lighter and lower olefins.

The FCC catalyst composition of the present disclosure shows better yield patterns in comparison to catalyst of the comparative Example-3 with excellent attrition index (AI) value. The salient features of FCC catalyst composition of the present disclosure is lower coke make and dry gas yield. Catalyst-4 and catalyst-5 showed better bottom upgradation conversion than the catalyst of the comparative Example-3.

EXAMPLE 6: Preparation of FCC Catalyst in Accordance with the Present Disclosure Ball milled pseudo boehmite (150 g) having an average particle size in the range of 1 to 8μ, was mixed with sodium free colloidal silica (833 g) to obtain a first slurry comprising sodium free colloidal silica and pseudo boehmite. Kaolin (349 g) was added to the first slurry under stirring to obtain a second slurry comprising Sodium free colloidal silica, clay and pseudo boehmite. Sodium free USY zeolite (376 g) having a silica to alumina ratio of 12:1, sodium hexa meta phosphate (8.0 g) and total water (1100 g) were mixed with the second slurry to obtain a third slurry having a pH of 6.5 and the third slurry was ball milled to obtain a homogenized slurry having average particle size less than 10µ. The slurry was spray dried and then calcined at 600° C. for 3 hours to obtain calcined FCC catalyst composition.

The calcined FCC catalyst composition was later treated with lanthanum nitrate salt solution (25 g in 1 L, 2.5 wt %) to exchange H of USY (100 g) to obtain the rare earth (RE) exchanged FCC catalyst composition. The RE exchanged FCC catalyst composition was calcined at 550° C. for 1 hour in a muffle furnace to obtain the FCC catalyst composition termed as catalyst-6.

Physico chemical properties of catalyst-6 were analyzed, which are presented in Table 5.

TABLE 5

Catalytic performance of FCC catalyst of the present disclosure (prepared in Example 6) compared with conventional FCC catalyst. Physicochemical properties

| Properties/Results | | |
|---|---|---|
| TSA (S), m$^2$/g | 183 | 218 |
| ZSA (S), m$^2$/g | 115 | 123 |
| MSA (S), m$^2$/g | 68 | 95 |
| TPV, cc/g | 0.33 | 0.33 |
| Activity (at 76% Conversion) | | |
| C/O ratio | 7.8 | 6.9 |
| Dry gas | 4.8 | 4.7 |
| LPG | 37.4 | 37.8 |
| Propylene | 14.9 | 15.2 |
| LCO | 16.3 | 16.4 |
| CSO | 7.7 | 7.6 |
| Coke | 4.4 | 4.4 |

After comparing the properties and the results obtained by using the catalyst of the comparative Example-3, and catalyst-6, it was observed that the results of the FCC process for catalyst-6 were better as compared to the catalyst of the comparative Example-3. The yields of the undesired products like coke remained unchanged. The yields of the undesired products like gasoline and dry gas were lower for catalyst-6, as compared to the catalyst of the comparative Example-3. Whereas, the yields of the desired products such as LCO, rest of LPG, and propylene increased. This reveals that the cracking of hydrocarbon feed by using the catalyst composition of the present disclosure resulted in production of lighter and lower olefins.

The FCC catalyst composition of the present disclosure shows better yield patterns in comparison to catalyst of the comparative Example-3 with excellent attrition index (AI) value. The salient features of FCC catalyst composition of the present disclosure is that the formation of coke make remains unchanged, and gasoline and dry gas were lower for catalyst-6. Thus, Catalyst-6 showed better bottom upgradation conversion than the catalyst of the comparative Example-3.

Technical Advancements

The present disclosure described herein above has several technical advantages including, but not limited to, the realization of an FCC catalyst composition:

for reducing the amount of LCO and CSO;
having higher stability and selectivity; and
that improves the yield of gasoline and propylene.

The disclosure has been described with reference to the accompanying embodiments which do not limit the scope and ambit of the disclosure. The description provided is purely by way of example and illustration.

The embodiments herein and the various features and advantageous details thereof have been explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An FCC catalyst composition in homogeneous particulate form, comprising:

i. Y-type zeolite in an amount in the range of 25 to 45 wt %;
ii. silicon oxide in an amount in the range of 20 to 40 wt %;
iii. alumina in an amount in the range of 5 to 25 wt %;
iv. at least one clay in an amount in the range of 5 to 35 wt %; and
v. at least one rare earth oxide in an amount in the range of 0.5 to 3 wt %;
wherein the weight % of each of the component is with respect to the total weight of the FCC catalyst composition;
wherein the Y-type zeolite has silica to alumina ratio (SAR) in the range of 8:1 to 15:1; and
wherein the FCC catalyst composition has an average particle size in the range of 45-120 μm.

2. The catalyst as claimed in claim 1, wherein said Y-type zeolite is ultrastable Y (USY) zeolite.

3. A process for catalytic cracking a hydrocarbon feed, said process comprising:
contacting said hydrocarbon feed with the FCC catalyst composition as claimed in claim 1, at a catalyst to oil (C/O) ratio of 4:1 to 12:1, at a temperature in the range of 530 to 575° C., to obtain gasoline, propylene and LPG in high yields and CSO and LCO in low yields.

4. The process as claimed in claim 3, wherein said feed includes olefin streams selected from the group consisting of C5-C12 naphtha, C4-C6 paraffin, gas oil, coker oil, resid hydrocarbons, crude oil, residue, slurry oil, biomass, waste plastic and combination thereof.

5. The process as claimed in claim 4, wherein said crude oil is a heavy crude.

6. A process for preparing a FCC catalyst composition, said process comprising the following steps:
   a. wet ball milling a precursor of alumina in an aqueous medium for 0.1-2 hrs, to reduce its average particle size to lie in the range of 1 to 8 μm;
   b. mixing the ball milled precursor of alumina with, a slurry comprising a clay and a dispersant, followed by stirring to obtain a first slurry comprising the precursor of alumina and the clay;
   c. adding a precursor of silicon oxide to the first slurry and stirring to obtain a second slurry comprising precursor of silica, precursor of alumina and clay;
   d. mixing Y-type zeolite having silica to alumina ratio in the range of 8:1 to 15:1, with the second slurry to obtain a third slurry having a pH value in the range of 6 to 7 and ball milling said third slurry to obtain a homogenized slurry;
   e. spray drying the homogenized slurry, followed by calcining to obtain microspheres;
   f. mixing the microspheres with a solution of at least one rare earth compound having a pH value in the range of 2 to 4, to form a suspension; and
   g. heating said suspension at a temperature in the range of 60 to 90° C. for a period of time in the range of 0.5 to 2 hours, followed by filtering, washing, drying at a temperature in the range of 80 to 120° C. and calcining at a temperature in the range of 450 to 650° C., for a time period in the range of 0.5 and 6 hours to obtain the FCC catalyst composition,
wherein the order of process steps (b) and (c) is interchangeable;
wherein said dispersant is either added with clay in process step (b), or with said Y-type zeolite in process step (d).

7. The process as claimed in claim 6, wherein said precursor of alumina is in an amount in the range of 5 to 25 weight % of the total weight of the homogenized slurry.

8. The process as claimed in claim 6, wherein said precursor of alumina is pseudo boehmite.

9. The process as claimed in claim 6, wherein said clay is in an amount in the range of 5 to 35 wt % of the total weight of the homogenized slurry.

10. The process as claimed in claim 6, wherein said clay is at least one selected from the group consisting of kaolin, montmorillonite, sapiolite, halloysite and bentonite.

11. The process as claimed in claim 6, wherein said dispersant is selected from the group consisting of sodium hexa meta phosphate, sodium pyrophosphate, poly acrylic acid, derivatives of poly acrylic acid and mixture thereof.

12. The process as claimed in claim 6, wherein said precursor of silicon oxide is in an amount in the range of 20 to 40 wt % of the total weight of the homogenized slurry.

13. The process as claimed in claim 6, wherein said precursor of silicon oxide is selected from the group consisting of sodium free colloidal silica, fumed silica, silicic acid and mixture thereof.

14. The process as claimed in claim 6, wherein said rare earth compound is in an amount in the range of 0.5 to 3 wt % of the total weight of the homogenized slurry.

15. The process as claimed in claim 6, wherein said rare earth compound is at least one selected from the group consisting of lanthanum nitrate, cerium nitrate, praseodymium nitrate and neodymium nitrate.

* * * * *